INVENTOR.
JAY H. GWYNNE
BY
HIS ATTORNEY

Aug. 28, 1962  J. H. GWYNNE  3,051,310
APPARATUS FOR AND METHOD OF SEGREGATING
MATERIAL BY SPECIFIC GRAVITY
Filed Feb. 2, 1961  2 Sheets-Sheet 2

INVENTOR.
JAY H. GWYNNE
BY Stanley J Price
HIS ATTORNEY

# United States Patent Office 3,051,310
Patented Aug. 28, 1962

3,051,310
APPARATUS FOR AND METHOD OF SEGREGATING MATERIAL BY SPECIFIC GRAVITY
Jay Howard Gwynne, Morgantown, W. Va., assignor to Consolidation Coal Company, Pittsburgh, Pa., a corporation of Pennsylvania
Filed Feb. 2, 1961, Ser. No. 86,799
6 Claims. (Cl. 209—172.5)

This invention relates to segregating material by its specific gravity and more particularly to apparatus for and a method of further segregating the float product of a heavy media separator to obtain a product having a minimum content of high specific gravity material.

Heavy media separators for segregating material according to its specific gravity are well known in the material separating art. In these separators, a heavy media usually formed of sand suspended in water is maintained within a vessel. The material to be separated is introduced onto the surface of the heavy media and the material which has a specific gravity less than the specific gravity of the suspension of sand and water ("float" material) floats over the surface of the heavy media and may be removed therefrom. Material which has a specific gravity greater than the suspension ("sink" material) sinks through the suspension and is removed from the bottom of the vessel. The inverted cone-type heavy media separator is extensively utilized in the mining and mineral industries. This heavy media separator employs an inverted conical vessel which contains an inventory of heavy media. The "float" material is removed from the surface of the media within the top of the vessel adjacent the base of the cone while the "sink" material is collected and removed from the bottom of the vessel adjacent the apex of the cone.

The present invention is directed to a novel apparatus for and method of withdrawing the float product from a heavy media separator in order to further segregate any high specific gravity material which may remain in the float product and thereby further purify the resulting end product. As is well known, the inverted cone-type separator is often utilized to wash raw coal as it comes from the ground in order to segregate the relatively low specific gravity pure coal from the high specific gravity material such as rock, slate, and clay which is known collectively as "ash." When a quantity of raw coal is introduced onto the surface of the heavy media within the cone, the relatively light specific gravity material floats across the surface of the heavy media whereas the high specific gravity ash material sinks through the heavy media and is withdrawn from the bottom of the vessel. The present invention will be described as it is applied to an inverted cone-type separator utilized for the cleaning of raw coal. It will become apparent that the apparatus and method herein described are equally useful for heavy media separators utilized in other industries. The description of a coal cleaning separator is intended to be descriptive only and the scope of the invention is to be limited only by the scope of the claims appended hereto.

In a conventional inverted cone-type separator, the raw coal introduced onto the surface of the heavy media within the vessel travels in a circumferential flow pattern about the circular upper surface of the heavy media within the vessel and the float material is withdrawn from the vessel through an overflow launder adjacent the upper surface of the heavy media within the vessel. This overflow launder through which the float material is removed extends generally radially when viewed in relation to the circumferential flow pattern of the material on the surface of the heavy media. When thus viewed, the overflow launder has an upstream side and a downstream side relative to the circumferential flow pattern.

One of the basic features in the practice of the present invention is the discovery that the amount of high specific gravity ash product in the overflow launder of the separator varies from the upstream side of the launder to the downstream side of the launder as the float material leaves the conical vessel. By way of explanation, it may be stated that some high specific gravity ash material is carried along with the float product through the overflow launder even though, theoretically, the movement of the raw coal over the surface of the media separates all the high density ash material by causing it to sink through the heavy media and be removed out the bottom of the vessel. In actual practice, the heavy media separator is not 100 percent efficient and some high specific gravity material will be carried into the overflow launder with the low specific gravity clean coal.

Once it was discovered that the percentage of high specific gravity material in the overflow launder varied in a transverse gradient from the upstream side of the launder to the downstream side of the launder, it was possible to add a flow dividing means to the overflow launder and thereby segregate the product material having smaller percentages of high specific gravity material from the product having higher percentages of high specific gravity material. In this way, a portion of the float product of the separator could be taken directly from the cone at a higher degree of purity than has hitherto been possible.

In the detailed description to follow, the exact manner of dividing the flow from the conical vessel within the overflow launder will be precisely considered. The degree of purity possible with such division of flow will also be discussed.

With the foregoing considerations in mind, it is a primary object of the present invention to improve a portion of the "float" material leaving a heavy media separator by reducing its content of high specific gravity "sink" material.

Another object of this invention is to provide an improved heavy media separator.

Another object of this invention is to provide a heavy media separator in which the float product is further classified as it leaves the separator to decrease the high specific gravity material in a portion of the product.

Another object of this invention is to provide a heavy media separator in which the float product is classified as it leaves the separator so that a product having a predetermined maximum percentage of high specific gravity particles may be withdrawn from the separator.

Another object of this invention is to provide a method of further classifying the float product of a heavy media separator as it is withdrawn from the separator.

These and other objects of this invention will become apparent as this description proceeds in conjunction with the accompanying drawings.

Figure 1:
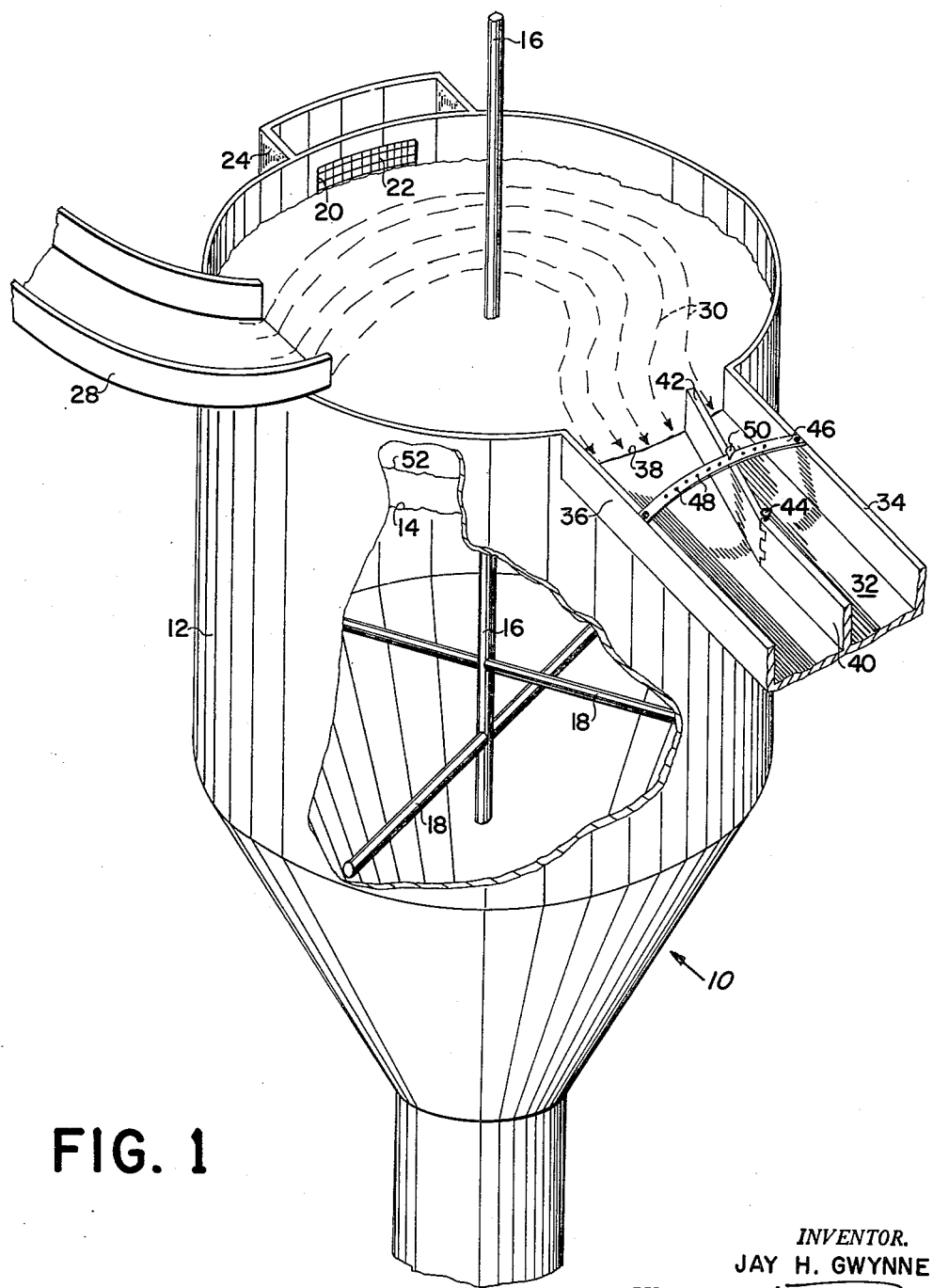
FIGURE 1 is a perspective view of an inverted cone-type separator with the apparatus of the present invention installed thereon.
Figure 2:
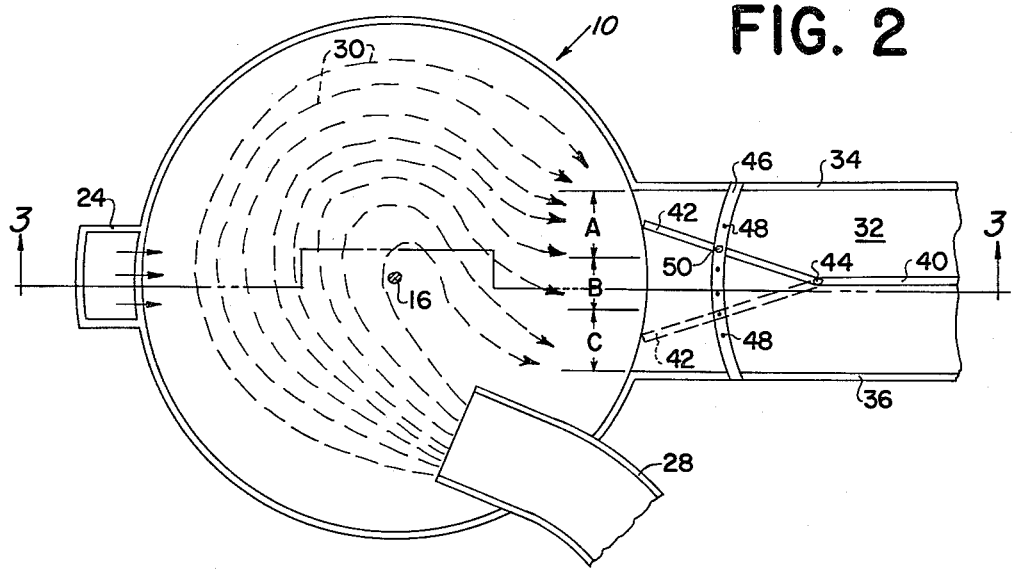
FIGURE 2 is a top plan view of the separator of FIGURE 1.
Figure 3:
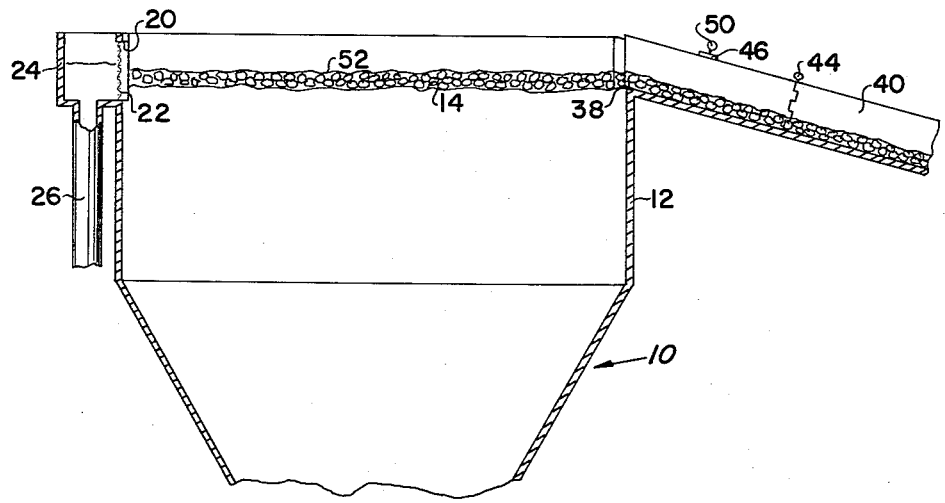
FIGURE 3 is a partial sectional elevation taken along line 3—3 of FIGURE 2.

Referring to FIGURES 1–3, there is shown an inverted conical vessel 10 having a cylindrical upper portion 12 filled with a heavy media preferably formed of a suspension of sand in water. The upper surface 14 of the heavy media is within the cylindrical upper portion of the vessel 10 and is generally circular in shape. An agitator 16 driven by drive means (not shown) is supported for rotation within the vessel 10 and has a plurality of radially extending agitator arms 18 affixed thereto. The agitator 16 agitates the water and sand within the vessel 10 to maintain the sand in suspension in the water and thereby maintain the heavy media of the vessel.

Adjacent the surface 14 of the heavy media, a sand make-up inlet 20 is formed in the cylindrical wall of vessel 10. Sand make-up inlet 20 has a screen 22 which permits sand and water to enter the vessel 10 from a sand make-up reservoir 24 formed on the outer periphery of vessel 10. A feed pipe 26 (FIGURE 3) conducts sand and water to reservoir 24 so that it may enter the vessel 10 as required. Since a quantity of sand and water will overflow the vessel 10 with the float product from the heavy media separator and since a second quantity of sand and water will leave the bottom of vessel 10 with the high specific gravity waste material, make-up water and sand must be provided to vessel 10 through reservoir 24.

A raw coal feed chute 28 is provided above vessel 10 to conduct the raw coal feed from a source (not shown) onto the surface 14 of the heavy media in vessel 10.

As indicated by the arrows 30 in FIGURES 1 and 2, the raw coal from chute 28 flows in a circumferential flow pattern over the surface of the heavy media. This circumefential flow pattern is due in part to the rotation of agitator 16 which causes swirling motion of the heavy media within vessel 10 and also due in part to the flow of make-up sand and water through inlet 20 from the make-up reservoir 24 which causes the direction of flow of the raw coal on the surface 14 of the heavy media to be reversed from the direction in which it is moving when it leaves the chute 28. This action of the flow from make-up reservoir 24 may best be seen in FIGURE 2.

Formed diametrically opposite the reservoir 24 adjacent the surface 14 of the heavy media within vessel 10 is an overflow launder 32. The overflow launder 32 is in the form of a flat bottomed flume which has an upstream side wall 34 and a downstream side wall 36. The side walls 34 and 36 are designated "upstream" and "downstream" when viewed in relation to the circumferential flow pattern indicated by flow arrows 30 which occurs on the surface 14 of the heavy media within vessel 10. A portion of the cylindrical wall of vessel 10 is removed to form an overflow weir 38 over which a low specific gravity float product flows when entering the overflow launder 32.

As thus for described, the heavy media separator is a conventional inverted cone-type havy media separator. The raw coal enters upon the surface 14 of the heavy media from the coal feed chute 28 and the low specific gravity float product overflows weir 38 and is removed through the overflow launder 32. The high specific gravity sink material sinks through the heavy media and is removed from the bottom of the vessel by conventional ash withdrawal means (not shown).

To practice the present invention, a flow dividing wall 40 is provided in overflow launder 32 between upstream side wall 34 and downstream side wall 36. At the end of flow dividing wall 40, a flow dividing gate 42 is hinged to wall 40 by hinge connection 44. The flow dividing gate 42 can be positioned in any one of a number of positions ranging from a position with its end close to the upstream side wall 34 as shown in FIGURES 1 and 2 to a position with its end closer to the downstream side wall 36 as shown in the dotted line position of FIGURE 2.

Extending across the overflow launder 32 is a gate guide 46 which has a plurality of holes 48 formed therein. The gate 42 is positioned so that a hole (not shown) within gate 42 registers with one of the holes 48 in gate guide 46. A keeper pin 50 is then inserted through gate guide 46 into gate 42 to maintain the gate 42 in a preselected position.

Before discussing in detail the function of gate 42, a basic discovery of the operating characteristics of a heavy media separator which let to the present invention should be considered in some detail. In a typical coal cleaning operation, the raw coal is introduced through the coal feed chute 28 and the float product remains upon the surface 14 of the heavy media. The coal surface is indicated 52 on FIGURES 1 and 3. As a quantitative example of the type of separation occurring in a typical installation, it was found that when raw coal having a size consisting of from 7 inches maximum to ⅜ of an inch minimum was introduced onto the surface of an inventory of heavy media having a specific gravity of 1.50, the raw coal feed, which had a 15 percent by weight original ash content, was cleaned to the extent that the coal leaving the cone through the overflow launder 32 had an ash content of 8.3 percent by weight. In analyzing the flow pattern within the overflow launder itself, however, it was found that the ash content of the coal was not uniformly 8.3 percent by weight throughout the entire launder but rather varied as samples were taken transversely across the launder from the upstream side wall 34 to the downstream side wall 36. FIGURE 2 shows an example of the areas selected for examination in one test that was made to determine the variations in ash content of the coal slurry in various parts of the overflow launder. To perform the test, the overflow launder was temporarily divided into three longitudinal sections indicated by zones A, B and C on FIGURE 2.

When so divided, it was found that while the overall ash content was 8.3 percent by weight of the coal leaving the cone through the launder 32, in zone A the overall ash content was only 6.7 percent by weight while in zone B the ash content was 7.5 percent by weight and in zone C the ash content was 10.5 percent by weight. Thus, it will be seen that as the position of the flowing stream varies from the upstream side wall 34 to the downstream side wall 36, the percentage by weight of ash content in that portion of the stream varies.

Having discovered the variation in ash content in a transverse gradient from the upstream side wall 34 to the downstream side wall 36 within the overflow launder, it was possible to install the flow dividing wall 40 and the flow dividing gate 42 in the overflow launder 32 in order to control the overall percentage by weight of ash to be removed in a portion of the float product removed from the heavy media separator. For example, if the gate were positioined so that it included only zone A, a portion of the float product leaving adjacent the upstream side wall 34 would contain 6.7 percent ash whereas that leaving adjacent the downstream side wall 36 would contain between 7.5 and 10.5 percent ash, being a mixture of zones B and C. By properly positioning gate 42, it is possible to reduce the percentage ash in a portion of the coal leaving the heavy media separator to a predetermined amount which falls within the range of variation of the concentration gradient from the upstream side to the downstream side of the overflow launder.

According to the provisions of the patent statutes, I have explained the principle, preferred construction and mode of operation of my invention and have illustrated and described what I now consider to represent its best embodiment. However, I desire to have it understood, within the scope of the appended claims, the invention may be practised otherwise than as specifically illustrated and described.

I claim:

1. A heavy media separator comprising a vessel containing an inventory of heavy media, said vessel formed so that said inventory of heavy media has a circular upper surface, means to introduce material having a mixture of specific gravities onto said media upper surface, means to cause low specific gravity material having a specific gravity lower than said heavy media to flow in a circumferential pattern on said media upper surface, an overflow launder extending radially from said vessel adjacent said media upper surface, said overflow launder having one end connected to the periphery of said vessel at such a height as to enable said low specific gravity particles to overflow said vessel periphery into said launder, said launder having an upstream side and a downstream side when viewed in relation to said low specific gravity material circumferential flow pattern, and dividing means positioned in said launder and extending the length of said launder to segregate material entering said launder adjacent said upstream side from material entering said launder adjacent said downstream side so that said material may be removed from said launder in segregated quantities, said dividing means including a pivoted splitter and a clamping means to position said pivoted splitter at varying distances between said launder upstream and downstream sides to permit selection of a desired portion of said segregated material overflowing said vessel periphery.

2. A heavy media separator comprising a vessel containing an inventory of heavy media, said vessel formed so, that said inventory of heavy media has a circular upper surface, means to introduce material having a mixture of specific gravities onto said media upper surface, means to cause low specific gravity material having a specific gravity lower than said heavy media to flow in a circumferential pattern on said media upper surface, an overflow launder extending radially from said vessel adjacent said media upper surface, said overflow launder having one end connected to the periphery of said vessel at such a height as to enable said low specific gravity particles to overflow said vessel periphery into said launder, said launder having an upstream side and a downstream side when viewed in relation to said low specific gravity material circumferential flow pattern, said launder extending downwardly from said media upper surface so that overflow from said upper surface will flow by gravity along said launder, dividing means positionable in said launder and extending the length of said launder to segregate material entering said launder adjacent said upstream side from material entering said launder adjacent said downstream side so that said material may be removed from said launder in segregated quantities, said dividing means including a pivoted splitter and a clamping means to position said pivoted splitter at varying distances between said launder upstream and downstream sides, to permit selection of a desired portion of said segregated material overflowing said vessel periphery.

3. A heavy media separator comprising an inverted conical vessel having a cylindrical portion adjacent its upper end, said vessel containing an inventory of heavy media having a circular upper surface within said vessel cylindrical portion, coal chute means to introduce raw coal containing high specific gravity impurities onto said media upper surface, means to cause low specific gravity coal having a specific gravity lower than said heavy media to flow in a circumferential pattern on said media upper surface, an overflow launder extending radially from said vessel adjacent said media upper surface, said overflow launder having one end connected to the periphery of said vessel at such a height as to enable said low specific gravity coal to overflow said vessel periphery into said launder, said launder having an upstream side and a downstream side when viewed in relation to said low specific gravity coal circumferential flow pattern, and dividing means positioned in said launder, and extending the length of said launder to segregate material entering said launder adjacent said upstream side from material entering said launder adjacent said downstream side, so that said material may be removed from said launder in segregated quantities, said material entering said launder adjacent said upstream side having a substantially lower percentage by weight of high specific gravity impurities than said material entering said launder adjacent said downstream side, said dividing means including a pivoted splitter and a clamping means to position said pivoted splitter at variable distances between said launder upstream and downstream sides to permit selection of a desired portion of said segregated material overflowing said vessel periphery to thereby control the overall percentage of high specific gravity impurities passing through said launder on each side of said dividing means.

4. The method of segregating the lower specific gravity fraction of material that will float upon the surface of an inventory of heavy media comprising the steps of floating said material in a circumferential flow pattern on the surface of said heavy media, withdrawing said material from said heavy media surface by causing said material to overflow the periphery of the vessel containing said heavy media as a slurry into a radially extending overflow launder having upstream and downstream sides when viewed in relation to said circumferential flow pattern, splitting said overflowed material into predetermined fractions at the periphery of said vessel and thereafter withdrawing from said launder at least a portion of said material entering said launder adjacent said upstream side as a segregated quantity from said material entering said launder adjacent said downstream side, said material withdrawn from said launder adjacent said launder upstream side having a lower specific gravity than said material withdrawn from said launder adjacent said launder downstream side.

5. The method of reducing the percentage by weight of high specific gravity material in a portion of a mixture containing material of varying specific gravities that will float upon the surface of an inventory of heavy media, said method comprising the steps of floating said mixture in a circumferential flow pattern on the surface of said heavy media, withdrawing said mixture as a slurry from said heavy media surface by causing said material to overflow the periphery of the vessel containing said heavy media into a radially extending overflow launder having upstream and downstream sides when viewed in relation to said circumferential flow pattern, splitting said overflowed material into predetermined fractions at the periphery of said vessel and thereafter withdrawing from said launder at least a portion of said mixture slurry entering said launder adjacent said upstream side, said portion withdrawn having substantially lower percentage of high specific gravity material than said mixture entering said launder.

6. The method of reducing the percentage by weight of high specific gravity waste material in a portion of total coal leaving a heavy media separator, said method comprising the steps of floating said coal in a circumferential flow pattern on the surface of an inventory of heavy media, withdrawing said coal as a slurry from said heavy media surface by causing said coal to overflow the periphery of the vessel containing said heavy media into a radially extending overflow launder having upstream and downstream sides when viewed in relation to said circumferential flow pattern, splitting said overflow coal into predetermined fractions at the periphery of said vessel and thereafter conveying said segregated fractions of said coal to discharge as separated fractions, said fraction entering said launder adjacent said upstream side having a substantially lower specific gravity than said total coal overflowing into said launder.

References Cited in the file of this patent
UNITED STATES PATENTS
2,355,735    Kerr _____ Aug. 15, 1944